United States Patent
Fujii et al.

(10) Patent No.: US 11,534,854 B2
(45) Date of Patent: Dec. 27, 2022

(54) FRICTION STIR WELDING TOOL AND FRICTION STIR WELDING METHOD

(71) Applicant: OSAKA UNIVERSITY, Suita (JP)

(72) Inventors: Hidetoshi Fujii, Suita (JP); Yoshiaki Morisada, Suita (JP); Yasuhiro Aoki, Suita (JP); Akihiko Ikuta, Higashihiroshima (JP)

(73) Assignee: OSAKA UNIVERSITY, Suita (JP)

( * ) Notice: Subject to any disclaimer, the term of this patent is extended or adjusted under 35 U.S.C. 154(b) by 36 days.

(21) Appl. No.: 15/734,338

(22) PCT Filed: May 28, 2019

(86) PCT No.: PCT/JP2019/021018
§ 371 (c)(1),
(2) Date: Dec. 2, 2020

(87) PCT Pub. No.: WO2019/235295
PCT Pub. Date: Dec. 12, 2019

(65) Prior Publication Data
US 2021/0220942 A1 Jul. 22, 2021

(30) Foreign Application Priority Data
Jun. 6, 2018 (JP) .............................. JP2018-108249

(51) Int. Cl.
*B23K 20/00* (2006.01)
*B23K 20/12* (2006.01)
(Continued)

(52) U.S. Cl.
CPC ...... *B23K 20/1255* (2013.01); *B23K 2103/02* (2018.08); *B23K 2103/14* (2018.08)

(58) Field of Classification Search
CPC .............. B23K 20/1255; B23K 20/122; B23K 20/124; B23K 20/1245; B23K 20/12; B23K 20/1265
See application file for complete search history.

(56) References Cited

U.S. PATENT DOCUMENTS 8,857,695 B2 10/2014 Takasugi et al.
2014/0124564 A1* 5/2014 Moriguchi .............. C23C 28/42
228/114.5
(Continued)

FOREIGN PATENT DOCUMENTS

JP 2010-46676 A 3/2010
JP 2012-170967 A 9/2012
(Continued)

OTHER PUBLICATIONS

International Search Report dated Aug. 13, 2019, issued in counterpart application No. PCT/JP2019/021018 (1 page).

*Primary Examiner* — Erin B Saad
(74) *Attorney, Agent, or Firm* — WHDA, LLP

(57) ABSTRACT

Provided are a long-life and inexpensive friction stir welding tool that is not dependent on the mode of friction stir welding or the type of material to be welded, and a friction stir welding method using the friction stir welding tool. The friction stir welding tool comprises a body portion having a shoulder portion, and a probe portion disposed on a bottom surface of the body portion, and is characterized in that the probe portion is spherical-crown shaped. Preferably, the shoulder portion is flat or convex, and preferably the hardness of the shoulder portion is greater than the hardness of the probe portion.

10 Claims, 11 Drawing Sheets

(51) Int. Cl.
    *B23K 103/14*        (2006.01)
    *B23K 103/02*        (2006.01)

(56)            References Cited

U.S. PATENT DOCUMENTS

2017/0151625  A1*   6/2017   Utsumi ................. B23K 20/12
2019/0168337  A1*   6/2019   Fujii ................... C04B 35/6455
2019/0210149  A1*   7/2019   Fujii ...................... C04B 37/02

FOREIGN PATENT DOCUMENTS

JP          2014-14822  A     1/2014
JP          2018-001261 A     1/2018
JP          2018-039027 A     3/2018

* cited by examiner

FRICTION STIR WELDING TOOL AND FRICTION STIR WELDING METHOD

TECHNICAL FIELD

The present invention relates to a friction stir welding tool and a friction stir welding method.

BACKGROUND ART

Friction stir welding (FSW) is known as a typical solid phase bonding method for metal materials. In the friction stir welding, the metal materials to be welded face each other at the welding portion, the probe provided at the tip of the rotation tool is inserted into the portion to be welded, and the rotation tool is moved along the interface to be welded while rotating, whereby the metal materials are subjected to material flow due to the friction heat and the stirring force of the rotating tool, which results in welding of the two metal materials. Friction stir welding is characterized in that the maximum temperature reached during the welding does not reach the melting point of the material to be welded, and the decrease in strength at the welded portion is smaller than that of conventional melt welding, and has been rapidly put into practical use in recent years.

However, while the friction stir welding has various excellent properties, since, in addition to the need to press-fit a tool that has a strength higher than that of the material to be welded, a large stress is applied to the tool, there rise big problems such as, depending on the material to be welded, cost and life of the tool. Specifically, though, when welding thin plates of relatively soft metals such as aluminum and magnesium, the load on the tool is small and there is no particular problem with tool life or welding conditions, when welding metals having a high melting point such as steel and titanium, the tool life will be extremely short.

On the other hand, in Patent Document 1 (Japanese Un-examined Patent Publication No. 2018-001261), there is proposed a friction stir welding tool comprising a base material, and a coating film which covers at least a part of the base material, wherein the coating film includes a compound, the compound contains a first element and a second element, the first element being at least one kind selected from a group consisting of elements of Group 4, elements of Group 5, elements of Group 6 in the periodic table, aluminum and silicon, the second element being at least one kind selected from a group consisting of carbon, nitrogen, oxygen and boron, the coating film includes a rough surface region, the rough surface region includes plural recess portions, a depth of the recess portion from an average surface of the rough surface region being 0.5 µm or more, in the rough surface region, the coating has a thickness of 2 µm or more and 1.2 µm or less.

In the friction stir welding tool described in Patent Document 1, it is said that, when the coating film contains a specific compound and contains a specific rough surface region, the rough surface region can be processed even if processing is repeated, because that frictional heat is efficiently generated because an appropriate roughness is maintained for a long period of time. Further, it is said that, as a result, the welding time is shortened, the amount of wear of the coating film per spot is also reduced, which results in establishing longer life of the friction stir welding tool.

Further, in Patent Document 2 (Japanese Un-examined Patent Publication No. 2018-039027), there is proposed a friction stir welding method for welding a pair of metal members by friction stir welding, comprising a step of fixing the pair of metal members so that the end side surfaces included in the welding region by the friction stir welding face each other, and a step of friction stir welding. In the friction stir welding step, the probe held by the processing tool protruding from the tool body is pressed against the pair of metal members from the upper side of the end side surface while being rotated together with the tool body, and moving relatively along a welding line of the pair of metal members in the region. In the fixing step, the pair of metal members are fixed so that at least the side surface of the tool body of the facing end side surfaces of the pair of metal members are separated by a distance shorter than the radius of the probe in at least a region of the welding line.

Here, in Patent Document 2, it is said that the metal material is softened by the frictional heat generated by the rotation of the probe and exists at the base of the probe, and the metal material present on the side of the base of the probe affects the amount of heat storage at the base of the probe and further prevents the movement of the probe along the welding line. In the friction stir welding method described in Patent Document 2, the amount of metal material that is softened by frictional heat and exists on the side of the base of the probe is reduced by separating the end side surfaces at a distance shorter than the radius of the probe. Therefore, according to this form of friction stir welding, the amount of heat stored at the base of the probe can be reduced to suppress the melting damage of the components of the probe, and the prevention to the movement of the probe along the welding line can be reduced. As a result, according to this manner of friction stir welding method, the life of the probe can be extended.

PRIOR ART DOCUMENTS

Patent Document

Patent Document 1: Japanese Unexamined Patent Application Publication No. 2018-001261
Patent Document 2: Japanese Un-examined Patent Application Publication No. 2018-039027

SUMMARY OF THE INVENTION

Problem to be Solved by the Invention

However, in the friction stir welding tool disclosed in Patent Document 1, in addition to the fact that the tool life is rate-determined by the surface state of the thin film, since the materials to be welded by friction stir welding are diverse, and universal improvement of the life of the tool cannot be achieved. Further, the friction stir welding tool is intended for spot welding, and it cannot be expected that the tool life will be improved for line welding where the welding time inevitably increases as compared with spot welding.

Further, in the friction stir welding method disclosed in Patent Document 2, it is necessary to accurately separate the short side surfaces of the material to be welded, which not only complicates the welding process but also increases the welding cost. In addition, such the separation significantly limits the proper welding conditions under which a good stirring part without defects can be obtained.

Considering the above problems in the prior arts, an object of the present invention is to provide a long-life and inexpensive friction stir welding tool that is not dependent on the mode of friction stir welding or the type of material to be welded, and a friction stir welding method using the friction stir welding tool.

Means to Solve the Problems

As a result of intensive research on the shape and the like of the friction stir welding tool in order to realize the above object, the present inventor has found that it is extremely effective to optimize the shape of the probe portion, and reached the present invention.

Namely, the present invention can provide a friction stir welding tool comprising:

a body portion having a shoulder portion, and a probe portion disposed on a bottom surface of the body portion, where the probe portion is spherical-crown shaped.

Here, in the friction stir welding tool, the "shoulder portion" is a portion that comes into contact with the surface of the member to be welded and mainly generates frictional heat, and the "probe portion" is a portion that is press-fitted into the member to be welded. Further, "friction stir welding" is a method of forming a stirring part by a friction stir welding tool and achieving welding by the stirring part. For example, in the case of friction stir welding of one member to be welded and the other member to be welded, the welding is achieved by forming a stirring part over both the one member to be welded and the other member to be welded, and the welding is achieved at the joining interface, and thus the friction stir welding does not include a method of mechanically joining by forming a hook or the like on the interface to be joined.

Regarding the friction stir welding in various modes, when the process of wear and breakage of the friction stir welding tool was observed in detail, it has been confirmed that, in case that the probe portion had a shape causing a large interaction with the member to be welded, it was advantageous from the viewpoint of forming the stirring part, but the probe portion was significantly worn and damaged, and the tool life was shortened.

To the contrary, in case that a spherical crown-shaped probe portion is provided on the bottom surface of the body portion, it is clear that the interaction between the probe portion and the member to be welded becomes extremely small, and wear and breakage of the probe portion are significantly reduced. On the other hand, since the stirring part required for friction stir line welding and friction stir point welding is sufficiently formed, it can be used as a friction stir welding tool.

In the friction stir welding tool of the present invention, it is preferable that the shoulder portion is flat or convex. Here, "the shoulder portion is convex" means that the shoulder portion has an inclined surface from the end portion of the shoulder portion to the root portion of the probe portion, and the shoulder portion is convex toward the probe portion. In addition, it is possible to employ, as the shoulder portion, a shape adopted for improving the stirring force used in a general friction stir welding tool, for example, by forming a scroll-shaped groove on the surface of the shoulder portion to improve the stirring force.

In friction stir welding, since the friction stir welding tool is press-fitted into the member to be welded while rotating, the peripheral speed at the end of the shoulder portion having a large diameter tends to be maximum, and the temperature in the region tends to rise. As a result, wear and damage often progress at the end of the shoulder portion, and the tool life is rate-determined by the probe portion or the end of the shoulder portion. Here, according to the friction stir welding tool of the present invention, since the probe portion is hardly worn and damaged, by making the shoulder portion convex and suppressing the wear and damage of the end portion of the shoulder portion, the tool life can be extended extremely efficiently.

Further, in the friction stir welding tool of the present invention, it is preferable that the hardness of the shoulder portion is higher than the hardness of the probe portion. In the friction stir welding tool of the present invention, since the probe portion is hardly worn or damaged, by making the hardness of the shoulder portion higher than the hardness of the probe portion and suppressing the wear of the shoulder portion, the tool life can be extended extremely efficiently.

Further, in the friction stir welding tool of the present invention, it is preferable that a substantially spherical body is used for the probe portion, and a part of the substantially spherical body is inserted into the bottom surface side of the body portion, and thus the substantially spherical body and the body portion are integrally formed. As the substantially spherical body having excellent wear resistance and high temperature strength, since various commercially available bearing balls and the like can be used, the tool can be manufactured at a low cost. In addition, by combining the probe portion and the body portion into the tool, the material and mechanical properties of the probe portion and the body portion can be easily adjusted.

Furthermore, in the friction stir welding tool of the present invention, it is preferable that the probe portion is made of any one of cemented carbide, cermet, silicon nitride, sialon, pc-BN and tungsten alloy. By using these materials for the probe portion, it is possible to extend the tool life even for the member to be welded, which has a large high temperature deformation resistance and the probe portion is significantly worn and damaged. Examples of the member to be welded include iron-based metals, titanium, titanium alloys, nickel and nickel alloys. Further, from the viewpoint of the price of the friction stir welding tool and the tool life, it is more preferable that the probe portion is made of silicon nitride.

Here, the material of the body portion of the friction stir welding tool of the present invention may be appropriately selected according to the material of the probe portion, the shape of the shoulder portion, and the like, and is not particularly limited as long as the effect of the present invention is not impaired, and for example, it is preferably composed of any of cemented carbide, cermet, silicon nitride, sialon, pc-BN and a tungsten alloy. The body portion (shoulder portion) and the probe portion may be made of the same material or may be made of different materials. When an aluminum alloy, magnesium alloy, or the like is used as the member to be welded, the probe portion and/or the body portion may be a tool steel such as SKD61 steel.

Further, in the friction stir welding tool of the present invention, it is preferable that the probe portion is press-fitted into a member to be welded made of any one of iron-based metal, titanium, titanium alloy, nickel and nickel alloy. Since the probe portion of the friction stir welding tool of the present invention has superior strength and durability as compared with the probe portion of a conventional general friction stir welding tool, it is possible to suitably press-fitted into a member to be welded having high strength and high temperature strength such as iron-based metal, titanium, titanium alloy, nickel and nickel alloy, and suitable friction stir welding can be realized.

Furthermore, it is preferable that the friction stir welding tool of the present invention is used for butt welding. In case of the friction stir point welding, the region where the probe portion is inserted is generally a recess in the welding portion, and it is not always required to fill the region with the member to be welded by plastic flow. Further, with respect to the overlap welding, if there is a stirring part for welding the upper and lower members to be welded, defect formation in the welding portion is allowed to some extent. On the other hand, in case of the line welding, it is necessary to form a defect-free stirring part in the region where the probe portion has passed, so that it is necessary to generate a smooth and sufficient amount of plastic flow. Here, while the probe portion of the friction stir welding tool of the present invention has good wear resistance and the like, it is possible to induce an appropriate plastic flow for forming a defect-free stirring part. The wear of the probe part is the result of the interaction between the surface of the probe part and the member to be welded, and the probe part suitable for inducing plastic flow often has poor wear characteristics, but according to the friction stir welding tool of the present invention, by optimizing the shape and material of the probe portion, these contradictory characteristics can be compatible with each other.

In addition, the present invention can provide a friction stir welding method, characterized in that a plurality of members to be welded are butt welded by using the friction stir welding tool of the present invention.

The friction stir welding tool of the present invention has a spherical crown-shaped probe portion, and though the stirring part formed by the probe portion is smaller than that of a probe portion having a general shape, it is possible to achieve not only the friction stir point welding or the friction stir overlap welding but also butt welding in which it is necessary to guarantee the formation of a stirring part in the depth direction corresponding to the interface to be welded. Further, since the friction stir welding tool of the present invention has an extremely long life, the welding cost can be significantly reduced. In addition, the number of replacement operations due to wear and breakage of the friction stir welding tool can be reduced, and the efficiency of the welding operation can be improved.

In the friction stir welding method of the present invention, it is preferable that at least one of the members to be welded is made of any one of iron-based metal, titanium, titanium alloy, nickel and nickel alloy. Since the friction stir welding tool of the present invention has a long life even for a member to be welded which has a large high temperature deformation resistance and gives remarkable wear and damage to the probe portion, a good joint can be efficiently obtained even for these members to be welded.

Further, in the friction stir welding method of the present invention, it is preferable that the plate thickness of the member to be welded is more than 1 mm and 4 mm or less. By making the plate thickness of the member to be welded more than 1 mm, it is possible to suppress deformation of the member to be welded due to friction stir welding, and by making the plate thickness of the member to be welded 4 mm or less, it is possible to easily press-fit the probe to the vicinity of the back surface of the member to be welded, even the probe being spherical crown-shaped. Further, the length of the probe portion needs to be equivalent to the plate thickness of the member to be welded, but the diameter of the spherical crown-shaped probe portion depends on the length. Namely, when used for an extremely thin plate, the diameter of the probe portion becomes small, which makes difficult to exhibit a sufficient friction stir effect, and when used for welding thick plates, the diameter of the probe portion becomes large, which makes the welding load and the like large. On the other hand, by setting the plate thickness of the member to be welded to more than 1 mm and 4 mm or less, both the length and the diameter of the probe portion can be in an appropriate range, and a good stirring part can be efficiently formed.

Furthermore, in the friction stir welding method of the present invention, it is preferable to achieve the friction stir welding by providing the friction stir welding tool with an advance angle of 1 to 5°. By setting the advance angle during friction stir welding to 1 to 5°, the plastic flow formed around the probe portion can be smoothed, and in a wide range of welding conditions (tool rotation speed, tool movement speed, etc.), a defect-free stirring part can be formed.

Effects of the Invention

According to the present invention, it is possible to provide a long-life and inexpensive friction stir welding tool that is not dependent on the mode of friction stir welding or the type of material to be welded, and a friction stir welding method using the friction stir welding tool.

MODE FOR CARRYING OUT THE INVENTION

Figure 1:
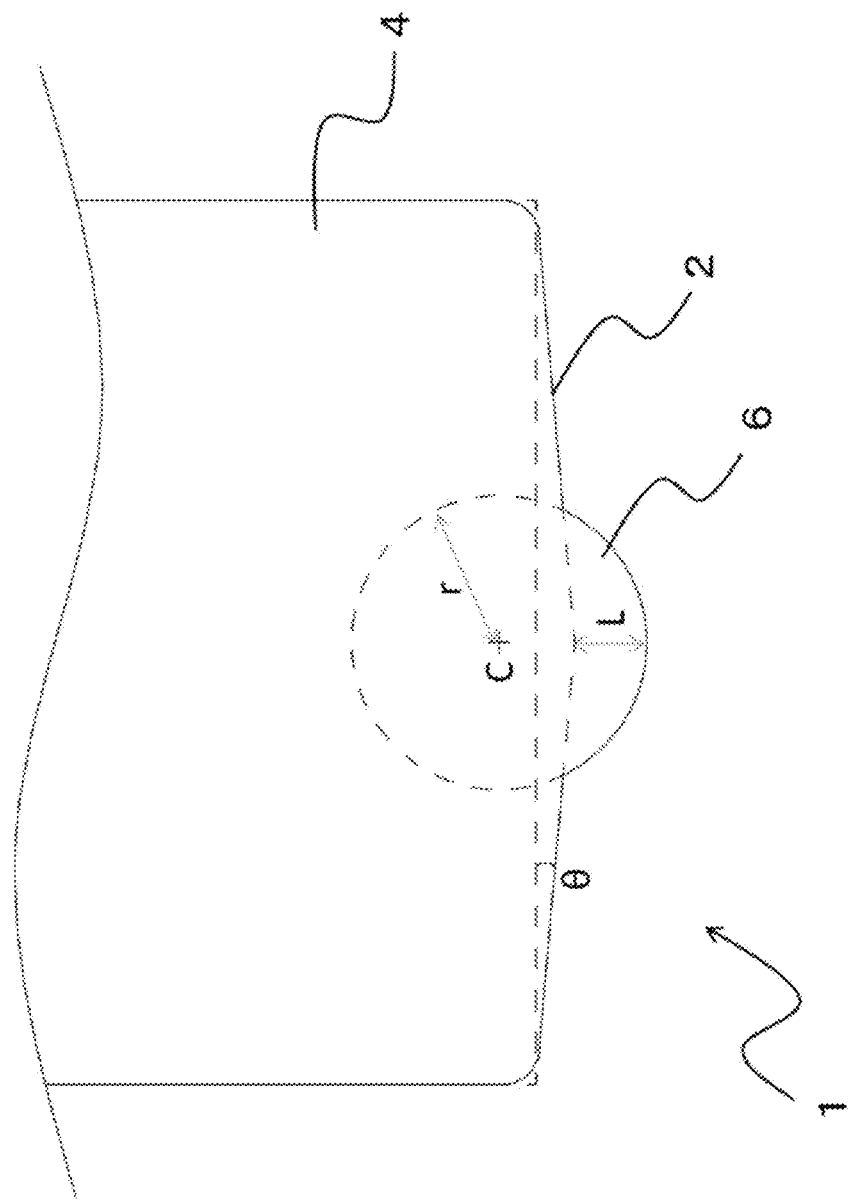
FIG. 1 is a schematic sectional view showing one example of the friction stir welding tool of the present invention.

In the following, typical embodiments of the friction stir welding tool and the friction stir welding method of the present invention are explained by referring the drawings, but the present invention is not limited only to these embodiments. In the following description, the same or corresponding part is designated by the same symbol, and there is a case that the redundant explanation is omitted. Further, since the drawing is to explain the concept of the present invention, there is a case that the sizes of the illustrated elements and a ratio thereof are different from the real case.

(1) Friction Stir Welding Tool

FIG. 1 shows schematic sectional view showing one example of the friction stir welding tool of the present invention. The friction stir welding tool 1 of the present invention has a body portion 4 having a shoulder portion 2, and a probe portion 6 disposed on a bottom surface of the body portion 4, where the probe portion 6 is spherical-crown shaped. Note that FIG. 1 shows a case where a substantially spherical body is used for the probe portion 6, and a part of the substantially spherical body is inserted into the bottom surface side of the body portion 4, and integrally formed, and, for example, the friction stir welding tool 1 may be performed by powder sintering of the same material, or may be performed by cutting from one bulk body or the like.

As the substantially spherical body having excellent wear resistance and high temperature strength, since various commercially available bearing balls and the like can be used, the tool can be manufactured at a low cost. In addition, by combining the probe portion 6 and the body portion 4 into the tool, the material and mechanical properties of the probe portion 6 and the body portion 4 can be easily adjusted. The method for integrally forming the probe portion 6 and the body portion 4 is not particularly limited as long as the effect of the present invention is not impaired, and various conventionally known forming methods can be used, for example, may be mechanically fixed or may be integrally sintered or the like.

The thickness that can be welded by the friction stir welding tool 1 is basically determined by the protruding length L of the probe portion 6 from the bottom surface of the body portion 4. The protrusion length L can be controlled by the radius r of the substantially spherical body used as the probe portion 6, the extent to which the substantially spherical body is inserted into the body portion 4, and the like. Here, from the viewpoint of reducing the resistance force applied to the probe portion 6 during the friction stir welding, it is preferable to position the center C of the substantially spherical body inside the body portion 4. Further, from the viewpoint of reducing the resistance force applied to the probe portion 6 during the friction stir welding and ensuring a sufficient effective welding length, it is preferable that the protrusion length L and the radius r are set to $0.5r<L<r$. The absolute value of L is preferably more than 1 mm and 4 mm or less, and more preferably 2 to 3 mm.

The shoulder portion 2 is preferably flat or convex. Here, the convex shape means that the shoulder portion has an inclined surface from the end portion of the shoulder portion 2 to the root portion of the probe portion 6, and the shoulder portion 2 is convex toward the probe portion 6. In addition, it is possible to employ, as the shoulder portion 2, a shape adopted for improving the stirring force used in a general friction stir welding tool, for example, by forming a scroll-shaped groove on the surface of the shoulder portion 2 to improve the stirring force.

Here, when the inclination θ of the shoulder portion 2 is too large, the frictional heat generated by the shoulder portion 2 cannot be sufficiently obtained, and, in addition thereto, the discharge of burrs cannot be effectively suppressed. Further, when the inclination of the shoulder portion 2 is reversed (concave), the wear and breakage of the end portion of the shoulder portion 2 becomes remarkable. Therefore, the inclination θ of the shoulder portion 2 is preferably 0° (flat) to 20°, more preferably 1° to 10°, and most preferably 2° to 5°.

Further, the hardness of the shoulder portion 2 is preferably higher than the hardness of the probe portion 6. In the friction stir welding tool 1 of the present invention, since the probe portion 6 is hardly worn or damaged, by making the hardness of the shoulder portion 2 higher than the hardness of the probe portion 6 and suppressing the wear of the shoulder portion 2, the tool life can be extended extremely efficiently.

The probe portion 6 is preferably made of any one of cemented carbide, cermet, silicon nitride, sialon, pc-BN and tungsten alloy. By using these materials for the probe portion 6, it is possible to extend the tool life even for the member to be welded, which has a large high temperature deformation resistance and the probe portion 6 is significantly worn and damaged. Examples of the member to be welded include iron-based metals, titanium, titanium alloys, nickel and nickel alloys.

The material of the body portion 4 may be appropriately selected according to the material of the probe portion 6, the shape of the shoulder portion 2, and the like, and is not particularly limited as long as the effect of the present invention is not impaired, and for example, it is preferably composed of any of cemented carbide, cermet, silicon nitride, sialon, pc-BN and a tungsten alloy. The body portion 4 (shoulder portion 2) and the probe portion 6 may be made of the same material or may be made of different materials. When an aluminum alloy, magnesium alloy, or the like is used as the member to be welded, the probe portion 6 and/or the body portion 4 may be a tool steel such as SKD61 steel.

(2) Friction Stir Welding

The friction stir welding method of the present invention is characterized in that a plurality of members to be welded are butt welded by using the friction stir welding tool of the present invention.

The welding is achieved by abutting the one member to be welded and the other member to be welded, by press-fitting the rotating probe portion 6 of the friction stir welding tool 1 into the butt region, and then by moving the friction stir welding tool 1 along the butt line.

The probe portion 6 has a spherical crown shape and has a small interaction with the member to be welded, and the stir zone formed by the probe portion 6 is smaller than the stir zone formed by a general friction stir welding tool, but, in the friction stir welding, it is sufficient that the interface to be welded is included in the stir zone, and a good joint can be obtained even when the friction stir welding tool 1 is used.

At least one of one member to be welded and other member to be welded is preferably made of any one of iron-based metal, titanium, titanium alloy, nickel and nickel alloy. Since the friction stir welding tool 1 has a long life even for a member to be welded which has a large high temperature deformation resistance and gives remarkable wear and damage to the probe portion 6, a good joint can be efficiently obtained even for these members to be welded.

Regarding other friction stir welding conditions, the insertion amount, rotation speed, moving speed, press-fitting load (welding load), and the like of the friction stir welding tool 1 are appropriately determined by the material and mechanical properties and thickness of one member to be welded and/or the other member to be welded, and the advancing angle of the friction stir welding tool 1 during friction stir welding is preferably 1 to 5°.

In the above, the typical embodiments of the present invention are explained, but the present invention is not limited to these embodiments, and various changes in design may be possible, those changes may be included within the scope of the present invention.

EXAMPLE

Example 1

Figure 2:
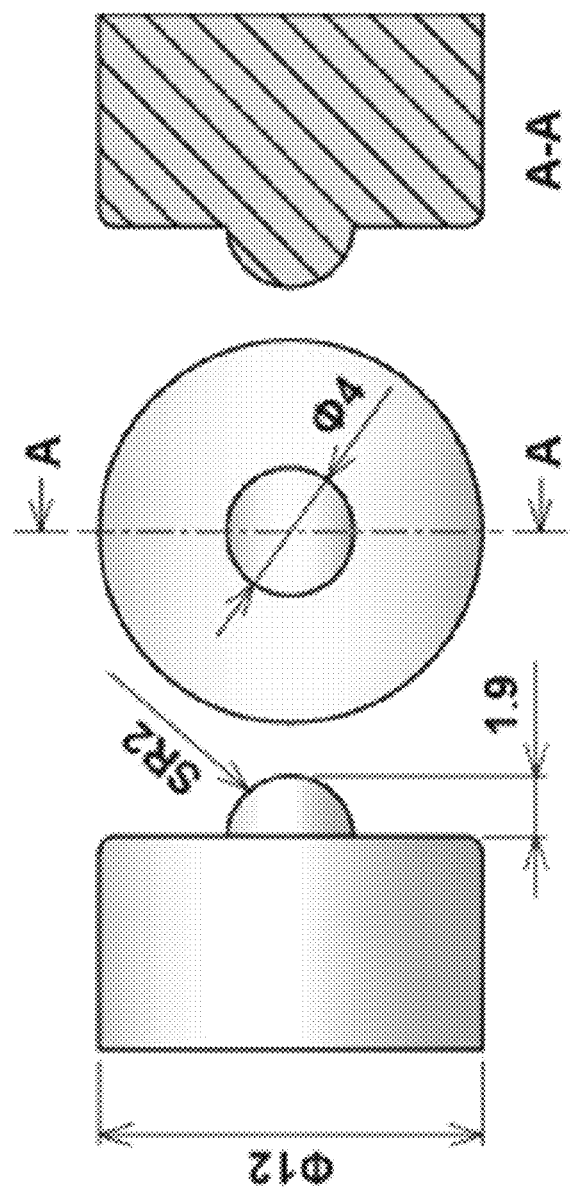
FIG. 2 is a schematic sectional view of the friction stir welding tool used in Examples.

For the purpose of confirming the shape and size of the stir zone formed by the friction stir welding tool of the present invention, friction stir welding was performed with respect to a medium carbon steel (S55C) plates of 350 mm×60 mm×6 mm with a star-in plate by using a tool made of cemented carbide having a shape shown in FIG. 2.

Figure 3:
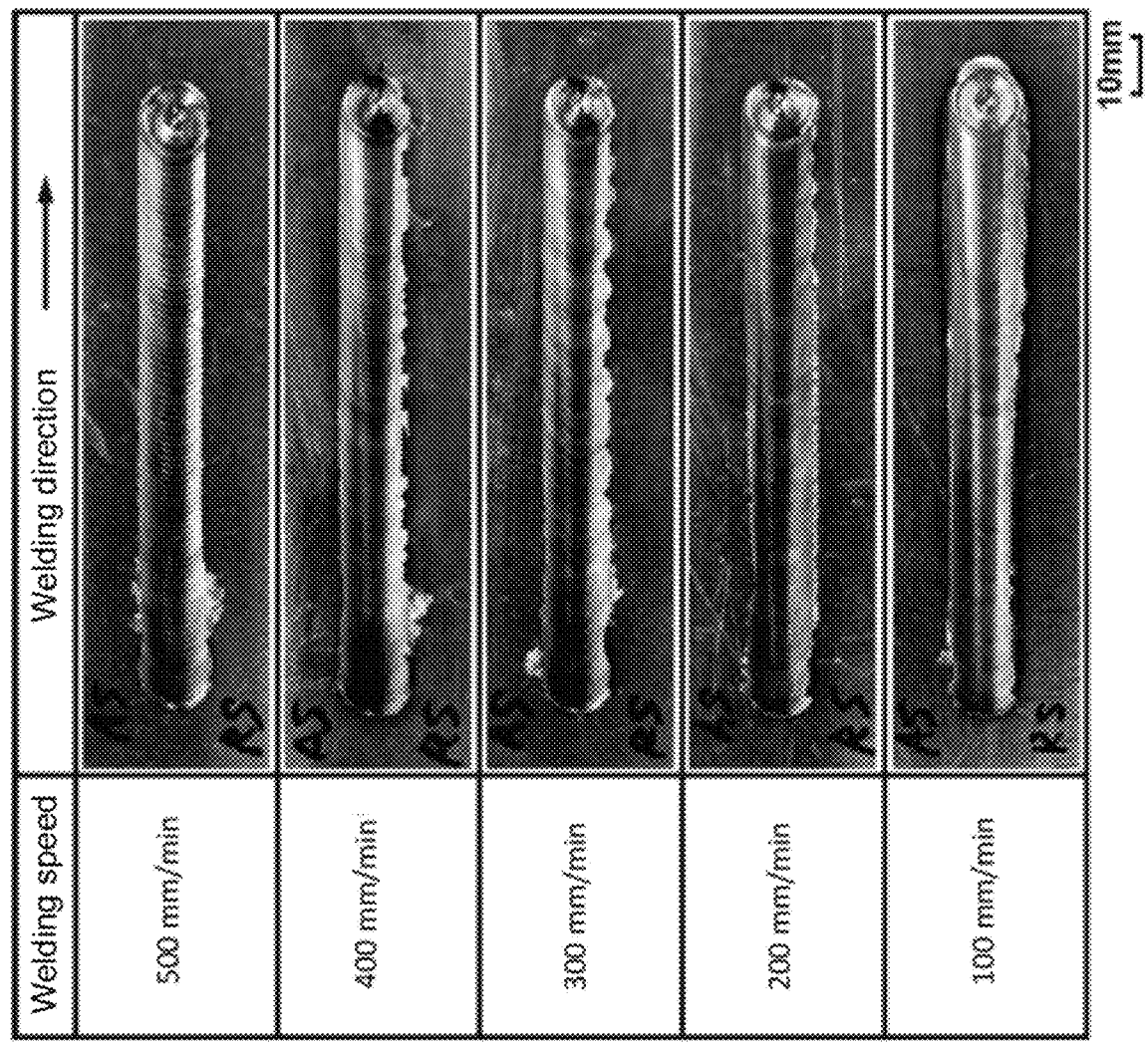
FIG. 3 is an appearance photograph of the sample piece which was subjected to the friction stir welding on the 6 mm thick plate in Example 1.

FIG. 3 shows an appearance photograph of the samples obtained when the tool rotation speed was 400 rpm, the tool moving speed (welding speed) was 500 mm/min to 100 mm/min, and the tool advance angle was 3°. Under any of the welding conditions, the surfaces of the stir zones were in the same state as a general friction stir welding. In addition, there was not observed any defect formed in the stir zone.

Figure 4:
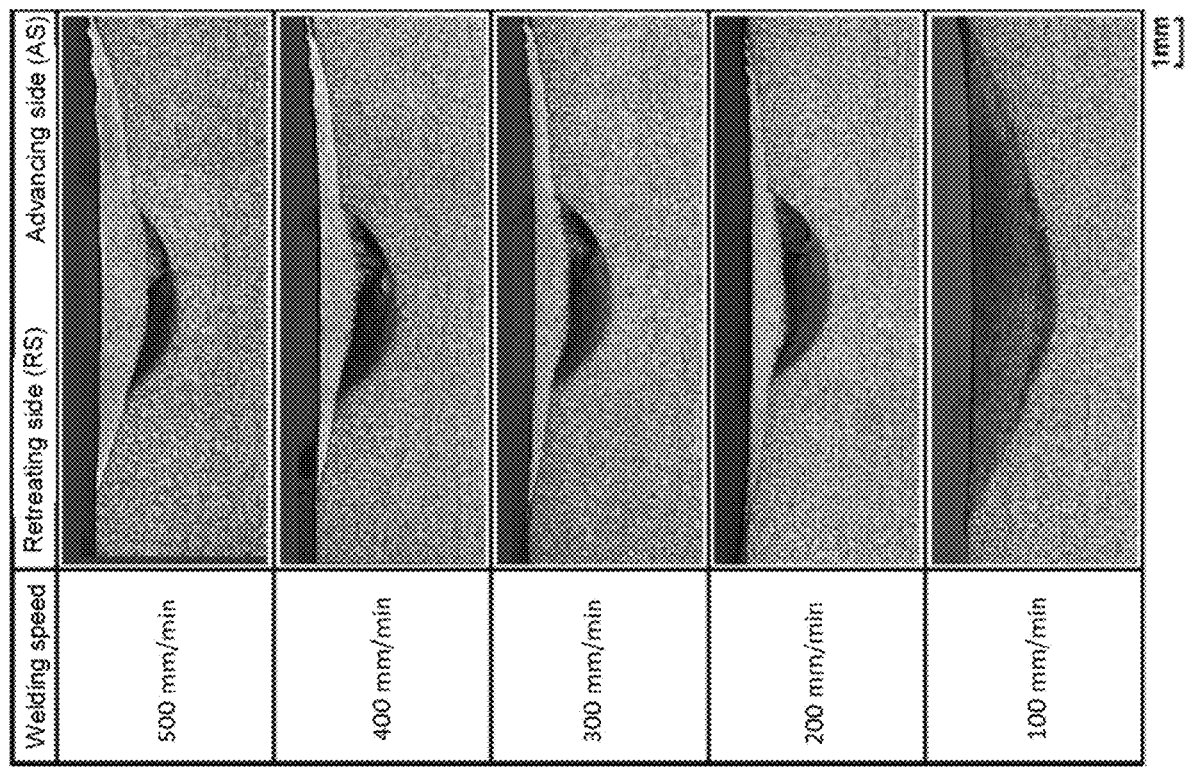
FIG. 4 is a sectional macro-photograph of the stir zones in FIG. 3.

FIG. 4 shows a sectional macro photograph of each stir zone shown in FIG. 3. The stir zone formed around the probe portion is smaller than that when a tool having a general shape is used, and, being particularly remarkable when the welding speed is high, a good stir zone is formed in the welding center portion corresponding to the interface to be welded. In the stir zone, the region where the cooling rate is high after the friction stir welding is white, and the region where the cooling rate is slow is black.

Figure 5:
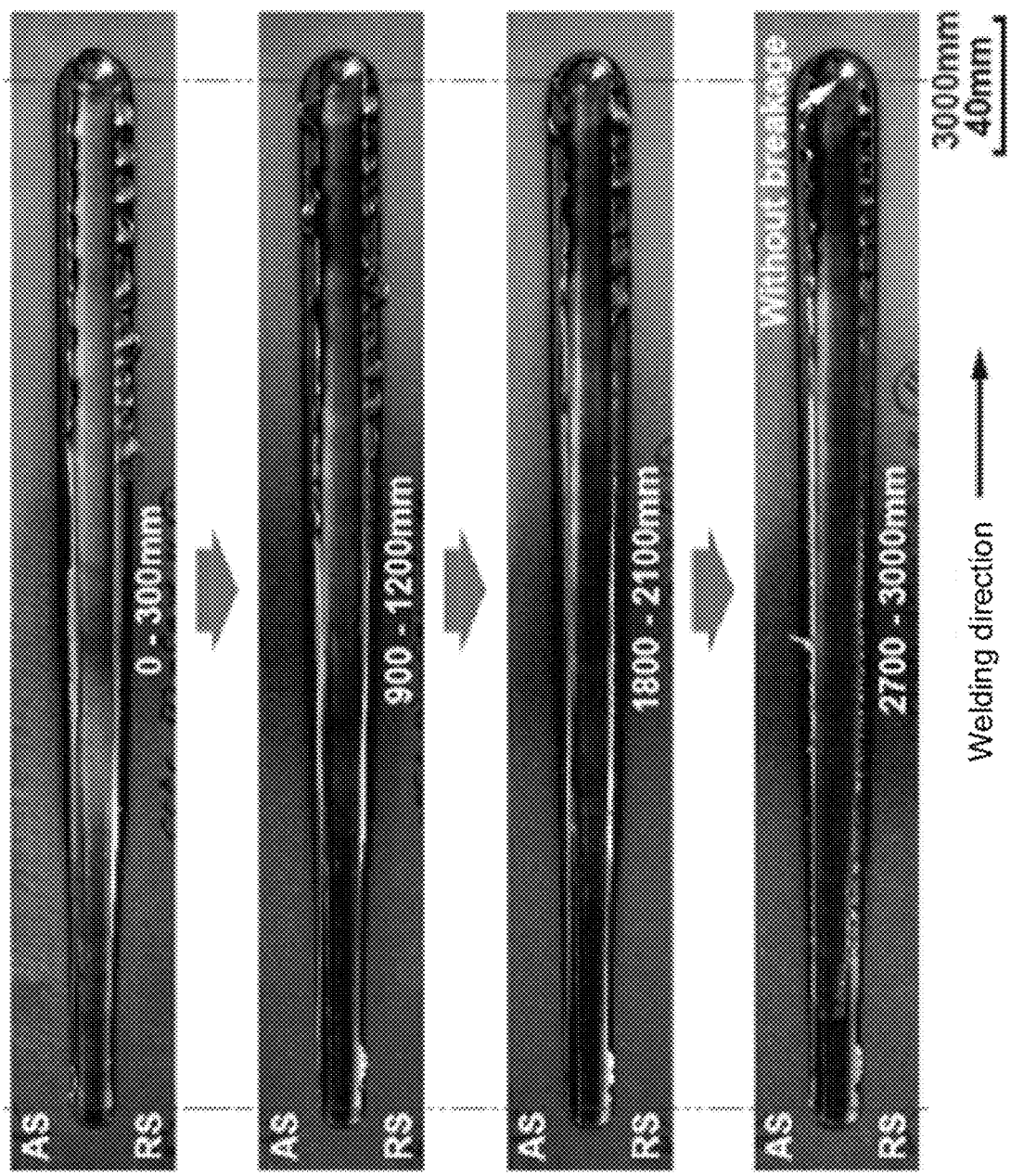
FIG. 5 is an appearance photograph of the sample piece which was subjected to the friction stir welding on the 2 mm thick plate in Example 1.

Next, for the purpose of evaluating the life of the friction stir welding tool of the present invention, friction stir welding was performed with respect to a medium carbon steel (S55C) plates of 350 mm×60 mm×2 mm with a star-in plate. The friction stir welding conditions were such that the tool rotation speed was 400 rpm and the tool moving speed (welding speed) was 100 mm/min. FIG. 5 shows an appearance photograph of the surface of the stir zone obtained up to a total welding length of 3000 mm. Almost no change in the surface shape of the stir zone was observed with the increase in the welding length, and it can be seen that a good stir zone was formed.

Figure 6:
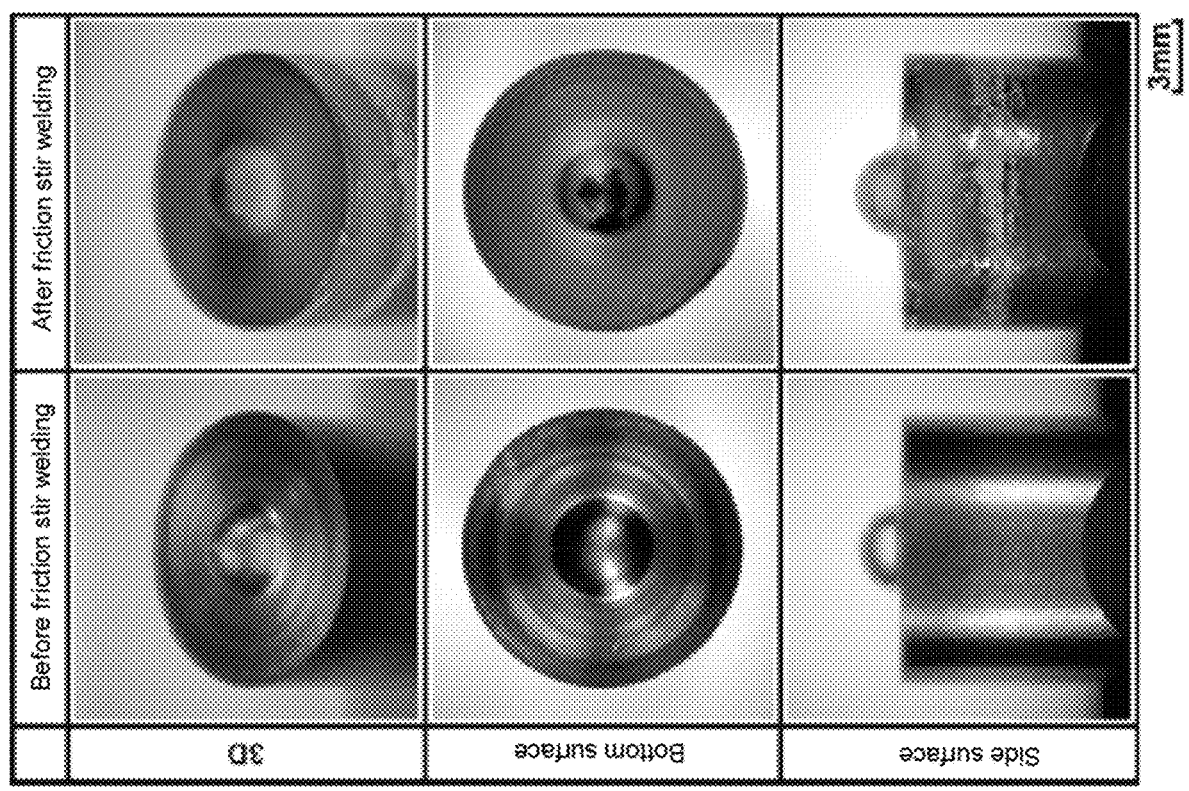
FIG. 6 is an appearance photograph of the friction stir welding tool used in Example 1 after achieving the friction stir welding (total welding length 3000 mm).

FIG. 6 shows an appearance photograph of the friction stir welding tool after achieving the friction stir welding of the total welding length 3000 mm. Although the shoulder portion is slightly retracted, no significant wear or breakage is observed in the probe portion, and the probe portion is maintained in a good condition. When friction stir welding was continued using the friction stir welding tool, at the time when the total welding length reached 4180 mm, the length of the probe portion became too long due to the retreat of the shoulder part, and it penetrated the member to be welded, and then, the test was finished. Even at the time when the total welding length reached 4180 mm, the probe portion maintained the state with no damage except for the increase in length.

Example 2

For the purpose of evaluating the life of the friction stir welding tool of the present invention, friction stir welding was performed with respect to a medium carbon steel (S55C) plates of 350 mm×60 mm×2 mm with a star-in plate by using a tool made of silicon nitride having the shape shown in FIG. 2.

Figure 7:
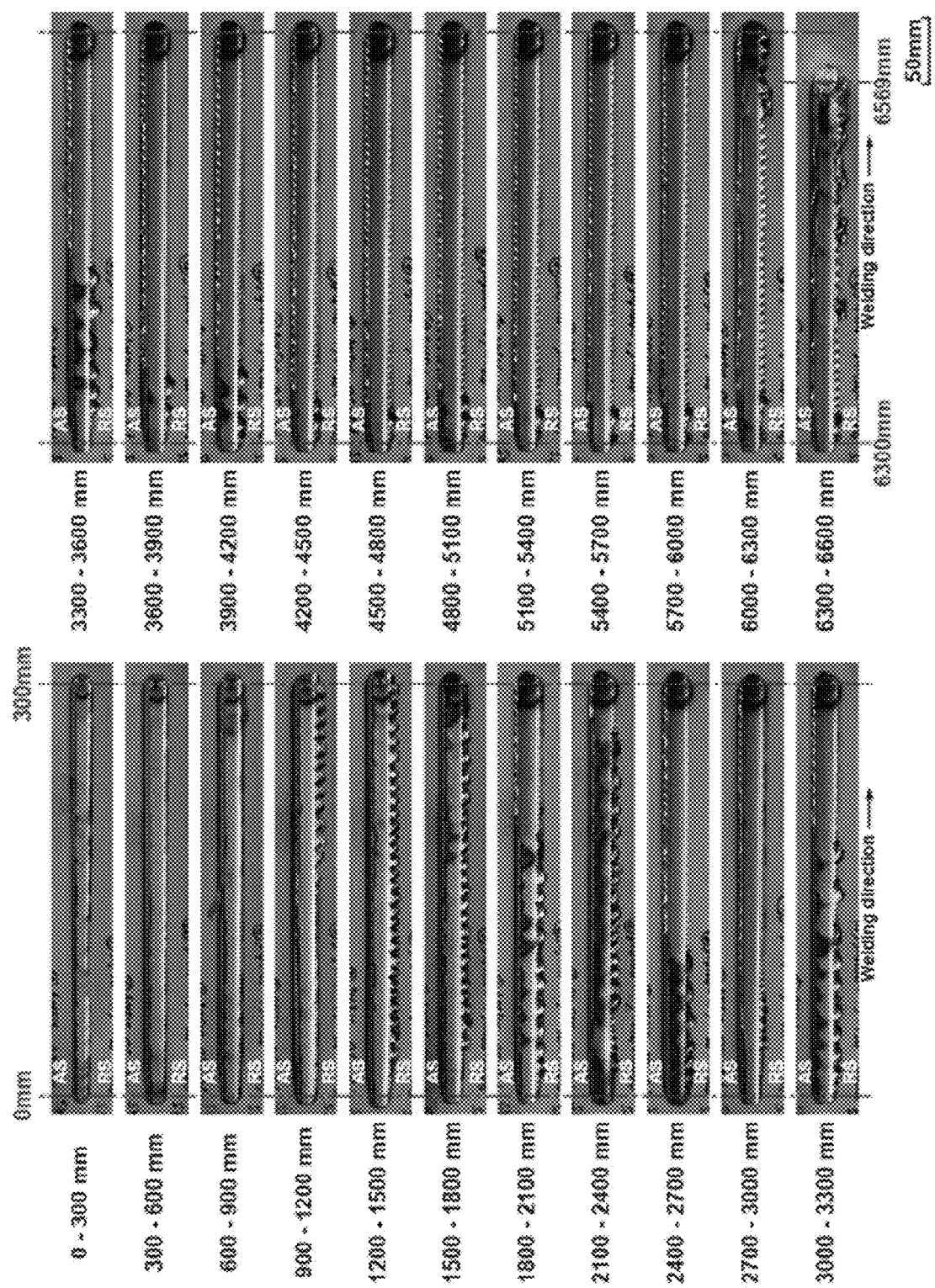
FIG. 7 is an appearance photograph of the sample piece which was subjected to the friction stir welding on the 2 mm thick plate in Example 2.

FIG. 7 shows an appearance photograph of the samples obtained when the tool rotation speed was 400 rpm, the tool moving speed (welding speed) was 100 mm/min, and the tool advance angle was 3°. Under any of the welding conditions, the surfaces of the stir zones were in the same state as a general friction stir welding. In addition, there was not observed any defect formed in the stir zone, and the total welding length until the breakage of the tool was 6569 mm.

Comparative Example 1

Figure 8:
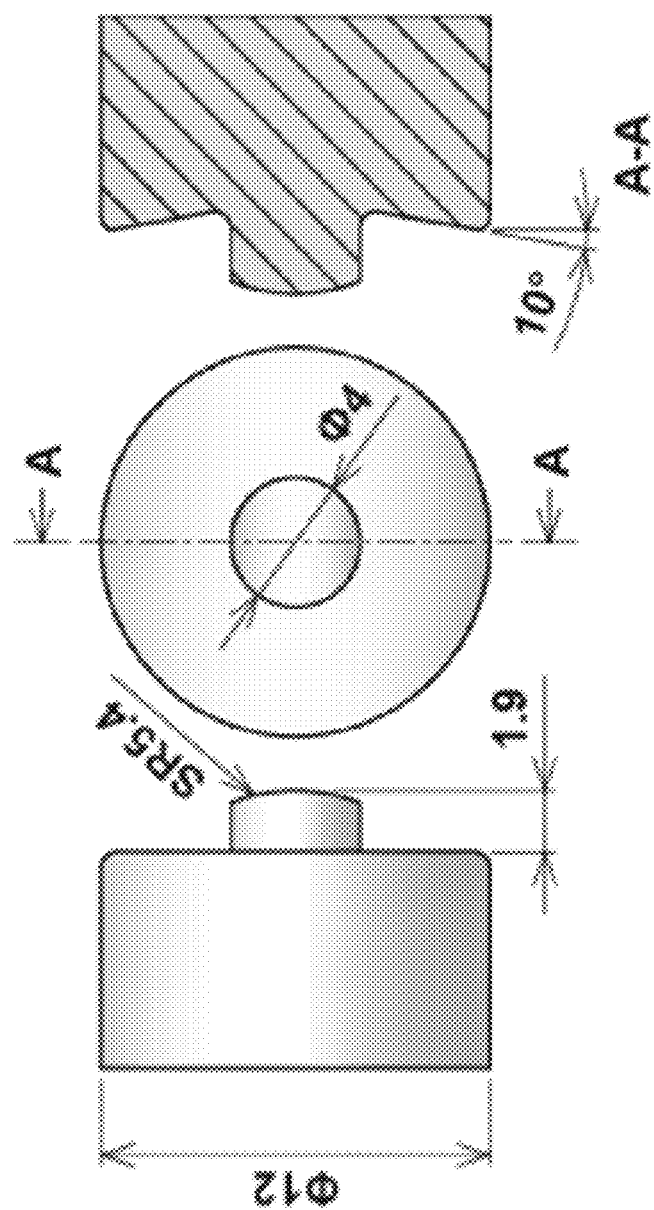
FIG. 8 is a schematic sectional view of the friction stir welding tool used in Comparative Examples.

The life of the friction stir welding tool having a general shape was evaluated in the same manner as in Example 1 except that the tool made of cemented carbide having the shape shown in FIG. 8 was used. The test member was a medium carbon steel (S55C) plates of 350 mm×60 mm×2 mm, and the friction stir welding conditions were a tool rotation speed of 400 rpm, a tool moving speed (welding speed) of 100 mm/min, and a tool advance angle of 3°.

Figure 9:
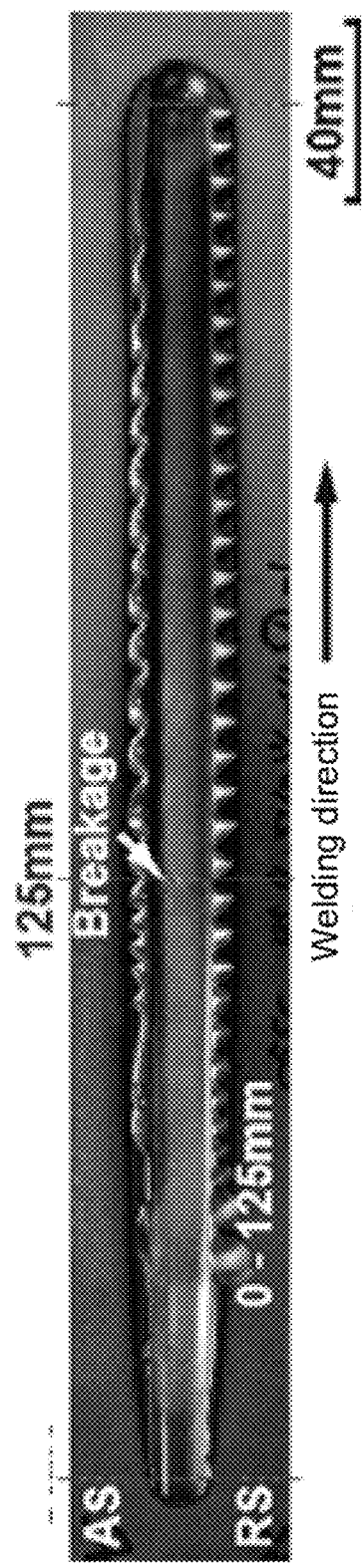
FIG. 9 is an appearance photograph of the stir zone obtained in Comparative Example 1.

FIG. 9 shows an appearance photograph of the surface of the obtained stir zone. The probe portion broke at a position 125 mm from the start of welding and was buried in the stirring part. Though the surface morphology similar to that of the stir zone is observed after 125 mm, the region is formed by the shoulder portion.

Figure 10:
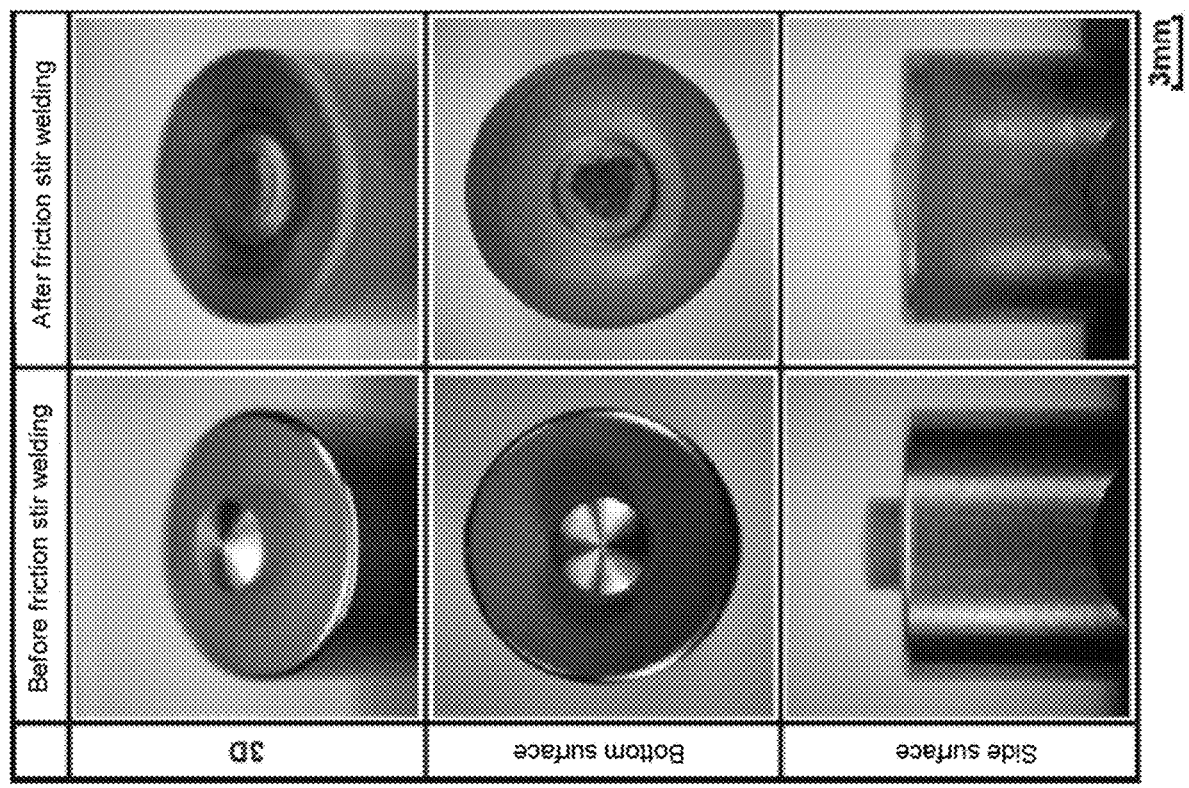
FIG. 10 is an appearance photograph of the friction stir welding tool used in Comparative Example 1 after achieving the friction stir welding.

FIG. 10 shows an appearance photograph of the friction stir welding tool after the test. It can be seen that the probe portion has completely disappeared due to breakage.

Comparative Example 2

The life of the friction stir welding tool having a general shape was evaluated in the same manner as in Example 2 except that the tool made of silicon nitride having the shape shown in FIG. 8 was used. The test member was a medium carbon steel (S55C) plates of 350 mm×60 mm×2 mm, and the friction stir welding conditions were a tool rotation speed of 400 rpm, a tool moving speed (welding speed) of 100 mm/min, and a tool advance angle of 3°.

Figure 11:
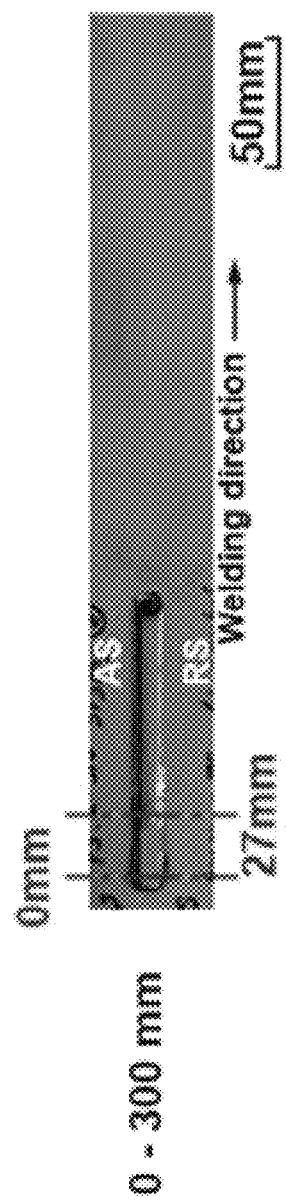
FIG. 11 is an appearance photograph of the stir zone obtained in Comparative Example 2.

FIG. 11 shows an appearance photograph of the surface of the obtained stir zone. The probe portion broke at a position 27 mm from the start of welding and was buried in the stir zone.

As described above, based on the results of Example 1 and Comparative Example 1, it has been confirmed that, when the friction stir welding tool of the present invention is made of cemented carbide, as compared with the friction stir welding tool having a general probe portion shape, the tool life is extended 30 times or more. Further, from the results of Example 2 and Comparative Example 2, it has been confirmed that, when the friction stir welding tool of the present invention is made of silicon nitride, as compared with the friction stir welding tool having a general probe portion shape, the tool life is extended 243 times.

EXPLANATION OF SYMBOLS

1 . . . Friction stir welding tool
2 . . . Shoulder portion
4 . . . Body portion
6 . . . Probe portion

The invention claimed is:
1. A friction stir welding tool comprising:
a body portion having a shoulder portion, and
a probe portion disposed on a bottom surface of the body portion,
where the probe portion is spherical dome shaped, and
wherein a hardness of the shoulder portion is greater than a hardness of the probe portion.
2. The friction stir welding tool according to claim 1, wherein the shoulder portion is flat or convex.
3. The friction stir welding tool according to claim 1, wherein a substantially spherical body is used for the probe portion, and a part of the substantially spherical body is embedded into the bottom surface side of the body portion, and thus the substantially spherical body and the body portion are integrally formed.

4. The friction stir welding tool according to claim 1, wherein the probe portion is made of any one of cemented carbide, cermet, silicon nitride, sialon, pc-BN and tungsten alloy.

5. The friction stir welding tool according to claim 1, wherein the probe portion is configured to be press-fitted into a member to be welded made of any one of iron-based metal, titanium, titanium alloy, nickel and nickel alloy.

6. The friction stir welding tool according to claim 1, which is configured to be used for butt welding.

7. A friction stir welding method, characterized in that a plurality of members to be welded are butt welded by using the friction stir welding tool of claim 1.

8. The friction stir welding method according to claim 7, wherein at least one of the members to be welded is made of any one of iron-based metal, titanium, titanium alloy, nickel and nickel alloy.

9. The friction stir welding method according to claim 7, wherein a plate thickness of the member to be welded is more than 1 mm and 4 mm or less.

10. The friction stir welding method according to claim 7, wherein the friction stir welding is achieved by providing the friction stir welding tool with an advance angle of 1 to 5°.

\* \* \* \* \*